United States Patent [19]

Wiegand et al.

[11] Patent Number: 4,631,974
[45] Date of Patent: Dec. 30, 1986

[54] POLYMERIC SPLIT SPROCKET WHEEL

[75] Inventors: James H. Wiegand, Franklin; Thomas J. Casper, Waukesha, both of Wis.

[73] Assignee: Envirex, Inc., Waukesha, Wis.

[21] Appl. No.: 796,143

[22] Filed: Nov. 8, 1985

[51] Int. Cl.⁴ .............................................. F16H 55/12
[52] U.S. Cl. ...................................... 74/450; 474/152; 474/903; 74/DIG. 10
[58] Field of Search .................. 474/152, 903; 74/439, 74/450, DIG. 10

[56] References Cited

U.S. PATENT DOCUMENTS

| | | | |
|---|---|---|---|
| 536,121 | 3/1895 | Bache | 403/344 X |
| 923,678 | 6/1909 | Masters | 403/344 |
| 1,540,096 | 6/1925 | West | 74/450 |
| 3,082,637 | 3/1963 | Paxton | 74/450 X |
| 3,106,101 | 10/1963 | Harriman | 74/450 X |

FOREIGN PATENT DOCUMENTS

| | | | |
|---|---|---|---|
| 892700 | 10/1953 | Fed. Rep. of Germany | 74/450 |
| 252623 | 3/1927 | Italy | 74/450 |

Primary Examiner—James A. Leppink
Assistant Examiner—Frank H. McKenzie, Jr.
Attorney, Agent, or Firm—Lawrence J. Crain

[57] ABSTRACT

A polymeric split sprocket wheel is provided having two mating portions that, when joined, form a split line at the junction of those portions, two side faces, a toothed outer rim and a central axial bore, and which is designed to be mounted on a relatively immobile yet rotatable keyed shaft, being secured thereon by means of a tripartite apparatus comprised of a captive slotted keyway molded into the central axial bore of the wheel, a circular band clamp capable of exerting a uniform degree of force all around the axial hub, and a plurality of wedge dog assemblies which join the wheel together along the split line by means of a plurality of wedge dog clamps which straddle the split line, are inserted into tapered receptacles, and are fixed to the wheel by fastening means.

18 Claims, 10 Drawing Figures

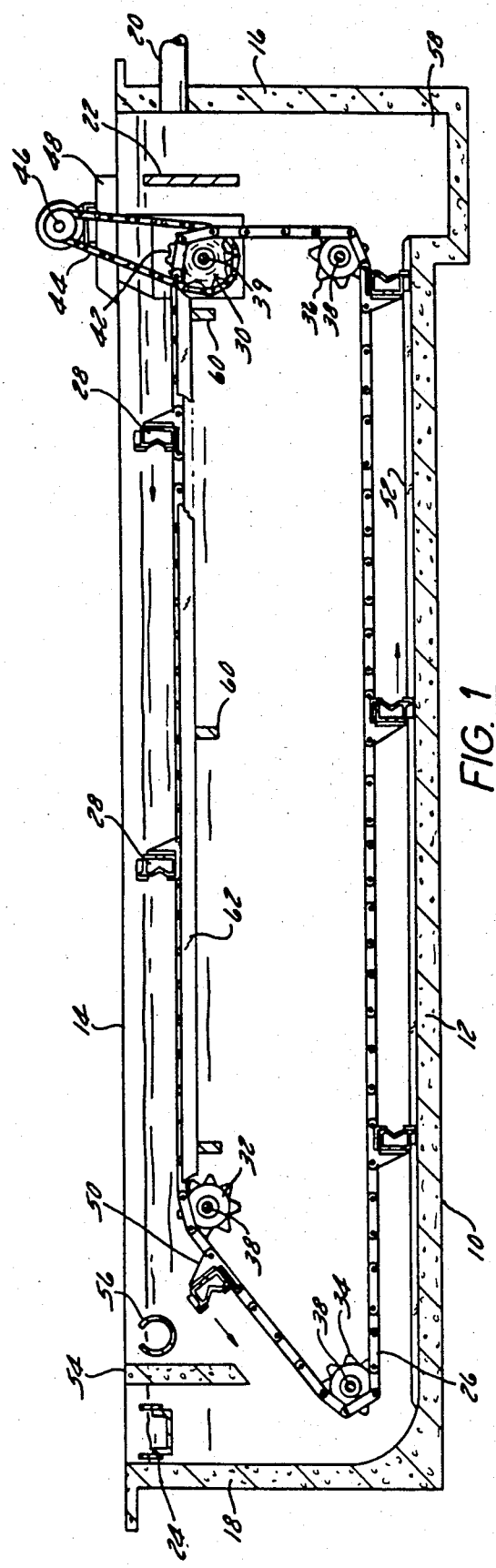

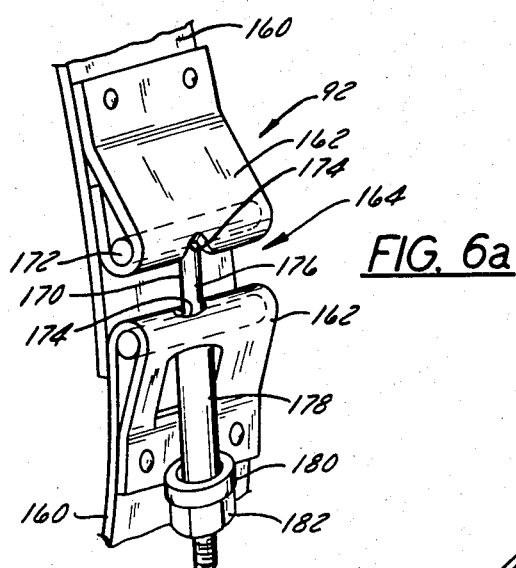
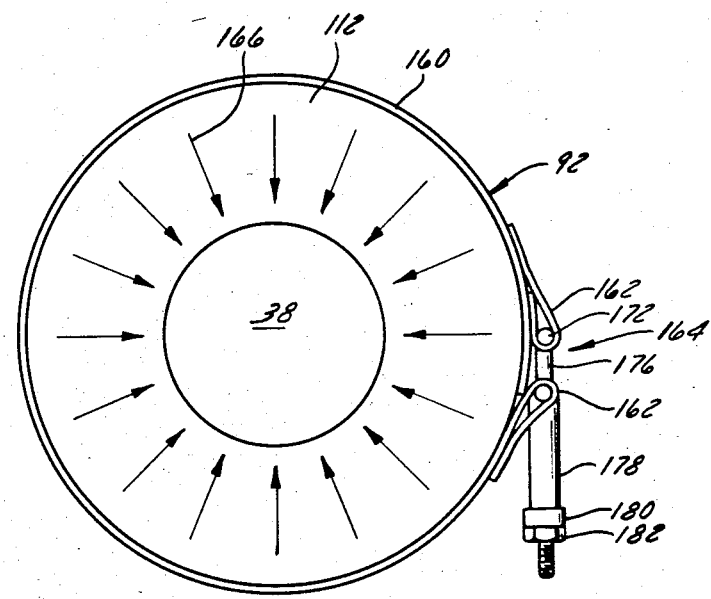
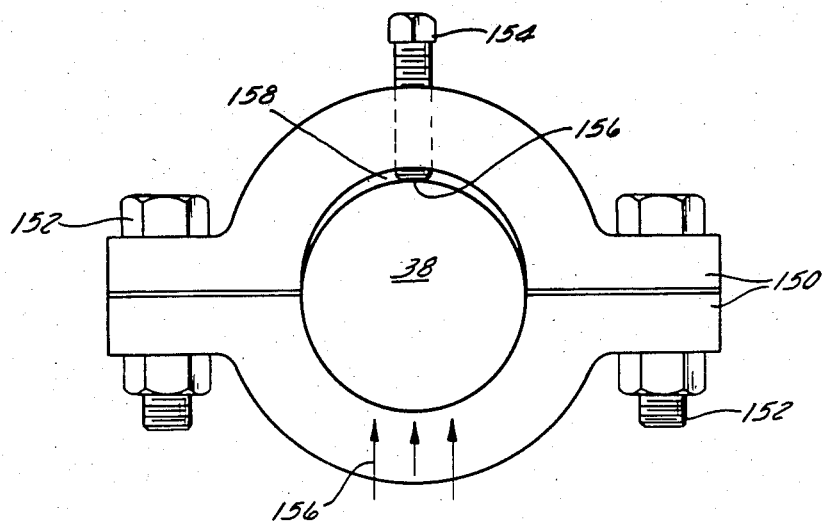

POLYMERIC SPLIT SPROCKET WHEEL

BACKGROUND OF THE INVENTION

The present invention relates to split polymeric sprocket wheels used on rotating power and idler shafts which are essentially inaccessible due to their weight, and/or working environment. More specifically, the present invention relates to improvements in the materials and means of attachment of split sprocket wheels used in chain drive systems used in substantially submerged or otherwise corrosive applications.

One example of a submerged, corrosive environment where split sprocket wheels are employed is in the chain drive system used to power a plurality of sludge collector flights in a circuit around a wastewater settling tank.

Conventional settling tanks employed solid metal sprockets and chains which decayed fairly rapidly in the corrosive wastewater. The metal sprockets were later manufactured in split form to facilitate their replacement without the previously encountered necessity of removing the entire shaft 38 from the tank 10, a costly and time-consuming process requiring heavy equipment.

In recent years, metal chain has been replaced in many tanks with polymeric designs fabricated from glass filled polyester, acetal resin or other plastics in an effort to solve the corrosion problem. This process of substitution of materials requires much more than simply replacing metal with plastic. Polymeric replacement chain must be capable of withstanding significant loading, pulling and compressing stresses from the combined weight of the flights, the trapped sludge and scum, and the drag inherent in a system operating in a tank full of liquid. Consequently, significant development time has been spent on new compounds which are satisfactory replacements for metal in the chain application.

Efforts were also made to manufacture a suitable polymeric substitute for the drive and idler sprockets. Problems occurred because the ideal material had to be strong enough yet not too brittle to be easily cracked nor too soft to be easily deformed. Even materials which satisfied the strength requirements were often subject to deformation when excessive torque was applied to localized areas in the process of mounting the sprockets on the shafts. An example would be in the use of set screws to affix a sprocket hub to a shaft. As a set screw is tightened, the polymeric hub is pulled out of round, resulting in less than total hub/shaft contact, resulting in an insecure mounting for the wheel on the shaft.

Thus, there is a need for a corrosion-resistant polymeric split sprocket wheel for a waste settling tank, which is capable of withstanding the loading stress created in pulling a sludge collector flight chain through a tank filled with wastewater, while also being capable of being disassembled and replaced on site without requiring removal of the main shaft. There is also a need for an apparatus to positively mount polymeric sprocket wheels on these shafts in a manner which will provide positive traction for the shaft yet will not secure the joined portions of the sprocket wheel with so much pressure as to cause deformation of the wheel.

Accordingly, it is a principal objective of the present invention to provide a polymeric split sprocket wheel capable of withstanding significant loading stresses of the type encountered in a wastewater treatment settling tank.

It is another objective of the present invention to provide a polymeric split sprocket wheel designed to be assembled on site without requiring removal of the propeller or idler shafts.

It is a further objective of the present invention to provide a polymeric split sprocket wheel attachment means which effectively secures the joined portions of the split wheel together without causing deformation of the wheel.

It is a still further objective of the present invention to provide a polymeric split sprocket wheel attachment means which effectively secures the joined portions of the split wheel to the rotating shaft without causing deformation of the wheel.

SUMMARY OF THE INVENTION

The present invention discloses a polymeric split sprocket wheel and attachment means which is designed primarily for use in wastewater treatment apparatus such as settling tanks, which employ chain drive systems. There has been a gradual shift in this industry from the use of steel components having tremendous rigidity but subject to corrosive elements in the wastewater, to polymeric components, for which the noncorrosive properties are well known, but until fairly recently satisfactory compounds having a combination of rigidity and resiliency have been unavailable.

The split sprocket wheel of the present invention is designed to be removably mounted on a relatively immobile yet rotatable rigid shaft yet strong enough to withstand the load forces generated by sludge collector flight chain drives without suffering either a loss of torque due to loosely fitting portions, or localized wheel deformation from extremely tight attachment means.

More specifically, the present polymeric split sprocket wheel comprises two mating portions, that, when joined, form a sprocket having two side faces, a split line at the junction of those mating portions, and an outer rim with a plurality of radially projecting sprocket teeth and axially extending chain support portions. In addition, the present invention comprises a hub portion with an axial bore having an internal captive slotted keyway and laterally extending axial hub shoulders, and a side wall portion having a plurality of tapered recesses.

The present invention is secured together and positively yet replaceably mounted to the shaft by a combination mechanism including a rigid key engaging the internal captive slotted keyway, and/or clamping means capable of exerting a uniform force around the entire periphery of the axially extending hub shoulders, and fastening means which hold the periphery of the wheel together by engaging the tapered recesses.

DESCRIPTION OF THE DRAWINGS

The invention and its many attendant objects and advantages will become better understood by reference to the following drawings, wherein:

FIG. 1 is a longitudinal sectional view of a settling tank employing the polymeric split sprocket wheel of the present invention;

FIG. 2a is a front elevational view in partial section of a settling tank chain idler shaft including the polymeric wheel of the present invention;

FIG. 2b is a front elevational view in partial section of a settling tank chain idler shaft including an alternate embodiment of the means of mounting the polymeric split sprocket wheel of the present invention;

FIG. 5 is a side elevation of a conventional means used to mount split polymeric sprocket wheels on rotating shafts;

FIG. 6 is a side elevation of the circular band clamp of the present invention;

FIG. 6a is a perspective elevation showing the clamping mechanism illustrated in FIG. 6;

DESCRIPTION OF THE PREFERRED EMBODIMENT

Figure 3:
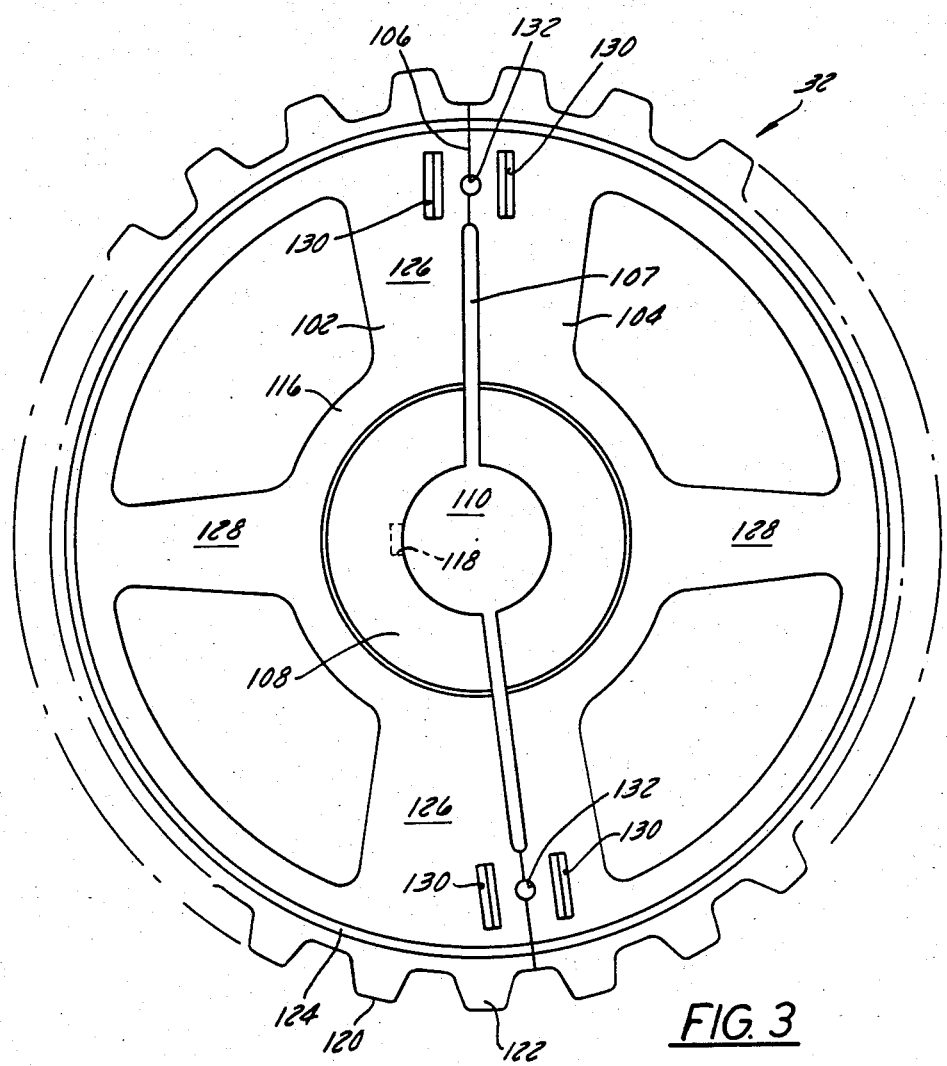
FIG. 3 is a side elevation of the polymeric split sprocket wheel of the present invention.
Figure 4:
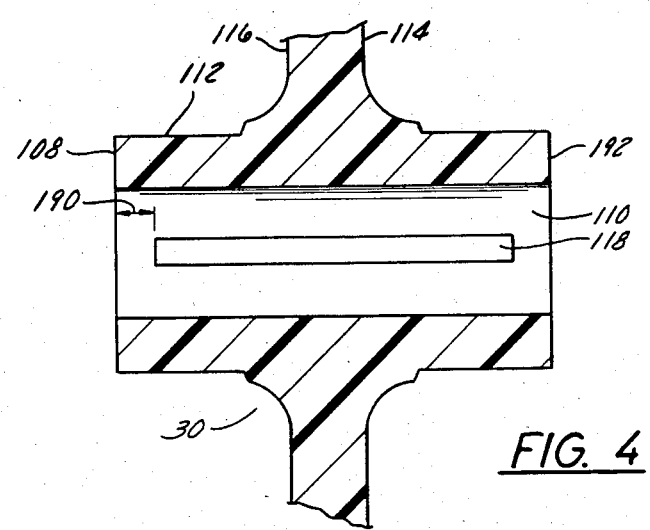
FIG. 4 is an enlarged sectional elevation of the hub portion of the polymeric split sprocket wheel of the present invention illustrating the captive slotted keyway.

Referring now to the drawings wherein like referenced characters designate identical or corresponding parts, FIG. 1 illustrates a primary settling tank 10 which is usually formed of reinforced concrete. The tank 10 comprises a bottom 12, a pair of opposite side walls 14, an influent end wall 16 and an effluent end wall 18. A conduit 20 extends through the influent end wall 16 and delivers the wastewater into the tank 10. A baffle 22 extends across the top of the tank 10 and between side walls 14, and extends downwardly in front of and somewhat below conduit 20 to minimize the turbulence created by the influent flow. The wastewater flows steadily through the settling tank 10 from the influent end wall 16 to the effluent end wall 18. One or more box weirs 24 near the effluent end wall 18 provide transverse channels for the flow of liquid out of settling tank 10.

As the wastewater flows through the tank, the settlable solids or sludge descend to the bottom 12, and the floatable wastes or scum rise to the surface of the wastewater. A collector mechanism is located in tank 10 to facilitate the removal of floating and submerged waste. The collector mechanism includes a pair of endless chains 26, preferably fabricated of polymeric material, each of which is located adjacent to one of the side walls 14. The endless chains 26 preferably serve as the carriers for the transverse collector flights 28; however, other flexible driving elements may be substituted. The endless chains 26 are parallel to each other and are trained around pairs of sprockets 30, 32, 34, and 36, all of which have teeth for engaging said chains. Each pair of sprockets 30, 32, 34, and 36 is mounted on a transversely extending shaft 38, the ends of which are rotatably mounted in bearings 40 (see FIG. 2). The bearings 40 for each shaft are secured to the side walls 14. The shaft 39 for the pair of sprocket wheels 30 has a driving sprocket 42 secured thereto, which is engaged by a driving chain 44 extending downwardly from a power drive unit 46 mounted on a platform 48. Thus, the pair of sprockets 30 drive the endless chains 26. The other pairs of sprockets and shafts engage the endless chains to guide their travel in tank 10 by defining their path.

A plurality of transversely extending collector flights 28 are secured to the endless chains 26 at selected sequential positions by attachment links 50 which are part of the chains 26.

In the bottom 12 of tank 10, there are embedded a pair of substantially parallel rails 52, which extend longitudinally in the tank 10 and extend slightly above the bottom 12 of tank 10 to provide tracks for the flights 28 as they are moved along the bottom 12 of tank 10 from the effluent end wall 18 through to the influent end wall 16 to collect settled sludge.

A baffle 54 extends across tank 10 in a position upstream of the effluent end wall 18 and prevents the floatable waste from flowing further downstream. Upstream of the baffle 54 and in front of the same, there is provided a collecting trough 56 for the floatable waste, and as the latter are skimmed from the surface of the wastewater, they are received in the collecting trough 56 to be discharged from tank 10. Similarly, at the influent end wall 16 there is provided a sludge trough 58 in which the sludge is deposited as it is collected from the tank bottom 12. The sludge is pumped from the sludge trough 58 intermittently or continuously in accordance with the process requirements.

A plurality of brackets 60 are secured to each side wall 14 below the tops of the same and at longitudinally spaced positions. A rail 62 is secured to the brackets 60 on each side wall 14. The rail 62 extends longitudinally along the side walls and provides tracks for the flights 28 as they are moved along the surface to skim the floatable waste therefrom.

The rails 62 are located at such an elevation that the transverse flights 28 are partially submerged in the wastewater as they ride along the rail 62.

FIG. 2a provides a more detailed view of the preferred embodiment mounted on one of the three idler shafts 38. The idler shaft 38 is designed to freely rotate within self-aligning bearings 40 mounted to the side wall 14 of tank 10. A polymeric split set collar 70 is clamped to the shaft 38 by a circular band clamp 90 where shaft 38 enters bearing 40 to restrict any lateral movement of shaft 38.

The split sprocket wheel 32 hereinafter described may be any one of either sprocket wheels 30, 32, 34 or 36 but for simplicity will be referred to as 32. For the most part, the wheels are identical, but special means, described below in greater detail, are provided to convert idler sprocket 32 to drive sprocket 30. Since idler shaft 38 provides no torque to the moving chain, but instead serves as a directional guide, all that is necessary for this guiding function is that the sprocket freely rotates with the chain 26. This can be accomplished in one of two ways. In FIG. 2b, sprocket wheel 32 is mounted in a fixed arrangement on shaft 38. This is accomplished by securely clamping sprocket wheel 32 on shaft 38 by a pair of circular band clamps 92 which are placed peripherally around the axially extending hub shoulder portion 100 of wheel 32 to provide the dual function of holding the halves of wheel 32 together as well as clamping the wheels to the shaft 38. Thus, in FIG. 2b, as the chain 26 rotates around idler sprockets 32, the shaft 38 rotates also.

When both sprockets 32 are mounted in fixed positions to shaft 38, problems have been encountered in the not infrequently occurring phenomonon of differential elongation of the two chains 26. If one chain should stretch more than its counterpart, when those chains reach a shaft 38 upon which idler sprocket wheels 32 are fixed, one chain may jump from the sprocket, necessitating a costly shutdown of the settling tank and a tedious, if not unpleasant repair.

To solve this problem of differential chain elongation, sprocket wheels may be constructed and arranged to rotate independently of each other, with one rotating independently of the shaft. FIG. 2a illustrates such a freely rotating sprocket wheel 32a, which is rotationally engaged to shaft 38. In addition to the circular band clamps 92 which are mounted on the axially extending hub shoulders 100 to hold together the two portions of split wheel 32a, a pair of split polymeric set collars 70 are secured to shaft 38 on either side of wheel 32a. The polymeric set collars 70 restrict the lateral movement of wheel 32a on shaft 38. With this type of independently rotating sprocket wheels, differential stretching of either chain can be compensated for.

Referring now to FIG. 3, the polymeric split sprocket wheel 32 of the present invention is illustrated, comprising two mating portions 102 and 104 which, when joined along a split line 106, form a hub portion 108 having an axial bore 110, hub shoulder 112 axially extending from each of two side faces 114 (not shown), 116 and a captive slotted keyway 118, the latter to be discussed below. Wheel 32 is further comprised of an outer peripheral rim 120 having a plurality of outwardly extending sprocket teeth 122 located in the middle of a pair of axially extending rim sections 124 which provide support for chain sidebars as the chain 26 travels around wheel 32.

Rim 120 is integrally connected to hub 108 by connecting means, which in the preferred embodiment consists of a plurality of spokes comprised of two thick spokes 126 and two thin spokes 128. The thick spokes 126 are so designed to encompass and provide structural support for the split line 106. Each spoke 126 is also equipped with a pair of radially oriented, tapered recesses 130 located proximate to peripheral rim 120 which straddle split line 106 in a parallel equidistant manner. Split line 106 has a bore 132 located midway between the ends of the tapered recesses 130. Tapered recesses 130 do not extend through the side faces 114, 116 of wheel 32, but there are corresponding tapered recesses positioned in back-to-back relationship on both side faces 114 and 116.

The mating edges of portions 102 and 104 are actually joined along line 106 only from bore 132 to rim 120. To utilize the compressability of the polymeric material, the edges of portions 102 and 104 are provided with a gap 107, extending from bore 132 to axial bore 110. When wheel 32 is assembled, gap 107 is on the order of 0.06 inch. It has been found that due to the natural compressability of the polymeric materials employed, a gap of this size will form a more mechanical fit and provide additional torque resistance when the wheel is placed in operation.

Figure 7:
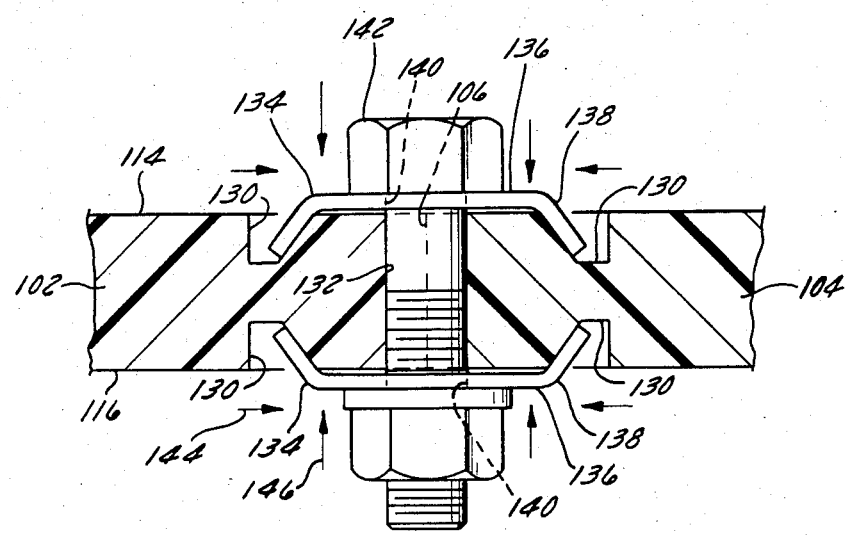
FIG. 7 is a sectional elevation of the wedge dog assembly of the present invention.
Figure 8:
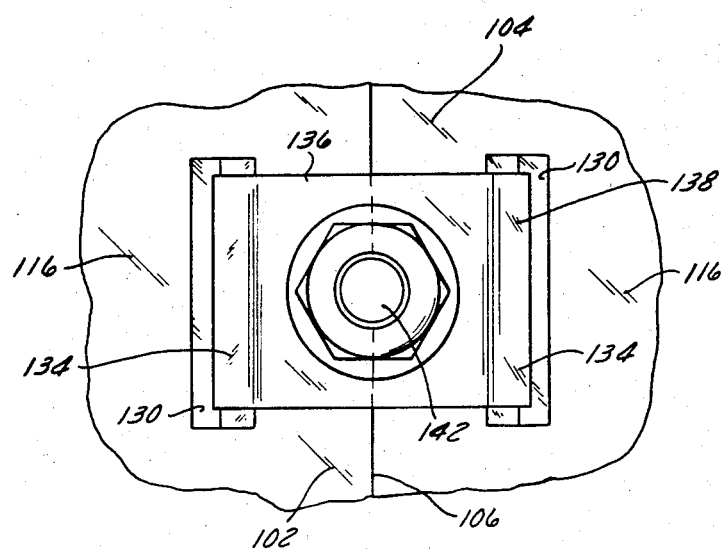
FIG. 8 is a bottom view of the wedge dog assembly illustrated in FIG. 7.

Referring now to FIGS. 7 and 8, the tapered recesses 130 and bore 132 are designed to accommodate wedge dog clamps 134 which are comprised of a central flat area 136 oriented parallel to and placed directly against side faces 114 and 116 and inwardly angled gripping areas 138. The angled gripping areas 138 of wedge dog clamps 134 are designed to be inserted into tapered recesses 130. Wedge dog clamps 134 also have a central bore 140 corresponding to bore 132 in wheel 32.

When the mating portions of wheel 32 are joined along split line 106, wedge dog clamps 134 are assembled on each side face 114 and 116 of wheel 32 so that the inwardly angled gripping areas 138 of wedge dog clamps 134 of either side face are facing each other as illustrated in FIG. 7. Once the bores 140 of corresponding wedge dog clamps 134 are aligned with bore 132, a rigid fastener such as a threaded bolt 142 is inserted therein to securely join the two portions of wheel 32.

Once the wedge dog clamps are assembled, they exert a bidirectional pulling force on the joined portions 102 and 104 of wheel 32 indicated by arrows 144 and 146 in FIG. 7. Reference No. 144 represents the diametrical pulling force exerted, while 146 represents a lateral pulling force exerted. This bidirectional pulling force exerted by wedge dog clamps 134 significantly increases the strength of wheel 32.

For anticorrosion purposes, wedge dogs 134 and fasteners 142 are fabricated from a non-corrosive material such as stainless steel.

The adjoining portions 102 and 104 of polymeric split sprocket wheel 32 of the present invention are not held together solely by the above-mentioned wedge dog clamps 134 but are also secured in the hub area. Referring to FIG. 5, conventional steel sprockets are normally joined at the hub by two-piece yoke clamps 150 fastened together by bolts 152. In instances where the wheel 32 must be fixed to the shafts 38, a set screw 154 is often used. Set screw 154 is threaded through one of the halves of the yoke clamp 150 in a line perpendicular to the axis of shaft 38, until the screw comes in contact with the shaft. The shaft 38 which may or may not have keyways or other specialized depressions (not shown) to help screw 154 retain the wheel 32 in position.

This hub securing apparatus works quite satisfactorily when all parts are made from steel or other metals. However, steel does have the drawbacks of susceptibility to corrosion, excess weight and, in the case of stainless steel, high cost. Earlier attempts to fabricate yoke clamps 150 for sprocket wheel retention from polymeric materials met with limited success due to the inability of the yoke clamp 150 to achieve a positive grip on the shaft 38. When a retention device such as a set screw 154 is employed in conjunction with a polymeric yoke clamp, it exerts a point load 156 on the shaft which is concentrated at 90° from the connection point of bolts 152. There is a resulting deformation 158 of the collar 150 due to the lack of creep resistance under this type of load which actually reduces the amount of shaft/surface contact desired for optimum gripping action.

Consequently, a hub clamping device was needed to hold the polymeric split sprocket wheel which, instead of exerting a concentrated pinpoint gripping action, would exert a uniform gripping force around the entire periphery of shaft 38.

Referring to FIG. 6, a circular band clamp 92 is illustrated comprised of a peripheral band 160, the ends of which have been doubled over and riveted to form loops 162 around 'T'-bolt clamping means 164. The result is a device for exerting a clamping force around the total periphery of hub shoulders 112 as indicated by force lines 166 in FIG. 6. This results in a hub retention device capable of exerting 360° of force while causing a negligible amount of deformation of the polyermic hub shoulder 112.

Referring to FIG. 6a, the 'T'-bolt 164 of clamping band 92 is illustrated in greater detail. The 'T'-bolt is comprised of a main 'T'-bolt portion 170, the head of which 172 is surrounded by an end loop of clamping band 92, with the exception of an aperture 174 through which is inserted shaft 176. Shaft 176 passes through a similar aperture 174 in the opposite end 162 of band 160.

Shaft 176 is then inserted into a T-shaped barrel assembly 178 with a blunt end 180 and is secured therein by a nut 182. The ends 162 of band 160 are drawn together by the tightening of nut 182 against the blunt end 180 of sleeve 178 on shaft 176.

The discussion has heretofore been concerned with the retention means of polymeric split sprocket wheels 32, 34 and 36 which are performing an idler function, whether they are in a fixed position as in FIG. 2b or freely rotating as in FIG. 2a. However, the construction of a split sprocket drive wheel 30 out of polymeric material posed unique problems due to the necessity for slip free contact between the wheel 30 and the drive shaft 39. If the drive sprocket 30 is not positively secured to the drive shaft, there will be no positive transmission of torque to the head shaft drive wheels.

Conventional drive sprocket hubs have been equipped with key seats extending the length of the hub for use in conjunction with slotted keyed shafts. As was the case with set screw retention devices described above, the keyed shaft system works well for steel hubs, but the deformability of polymeric hubs resulted in keyways becoming distorted and bores enlarged as shown in FIG. 5.

The present invention solves the drive sprocket slippage problem by employing the use of an internal captive keyway 118 molded into the axial bore 110 of the hub portion 108 of drive sprocket wheel 30. Because the keyway 118 is captive, it does not extend a full hub length, but terminates a short distance from either hub face 192. The remaining diameter bore 190 at each end of the hub serves as a key retainer. The band clamps 92 work in concert with keyway 118 to ensure positive torque transmission between the head shaft and sprocket wheels by restraining movement of the hub material and thereby prevent keyway distortion.

Molding of the key seat adds nothing to the cost of the sprocket wheel 32. In addition, all wheels 30, 32, 34 and 36 can be fabricated identically and molded with keyways 190 without suffering a decrease in strength even though those keyways are not used in securing sprockets to the idler shafts.

For ease of installation, split line 106 is cut so that it forms an angle of less than 180°, leaving the mating portions 102 and 104 of wheel 32 of unequal size. This aids in installation of the wheel of the present invention on a shaft by allowing one mechanic to first install the larger half 102 which will grip to and remain fixed on shafts 38 or 39 without the need for assistance of the mechanic, leaving his hands free to attach portion 104 and secure it with band clamp 92 and wedge dogs 134. Drive sprockets 30 are assembled in substantially the same manner with the added step of inserting the key (not shown) into keyway 118 on portion 102 prior to placing it on shaft 39.

Thus, the present invention discloses a polymeric split sprocket wheel and retention apparatus comprised of a polymeric wheel divided into unequal mating portions with integrally molded features which allow it to be securely joined and attached to a rigid shaft by means of a tripartite apparatus including wedge dog clamps, peripheral hub clamps and an internal captive keyway.

While a particular embodiment of the polymeric split sprocket wheel has been shown and described, it will be obvious to persons skilled in the art that changes and modifications might be made without departing from the invention in its broader aspects.

What is claimed is:

1. A polymeric split sprocket wheel designed to be mounted on a rigid shaft and having two adjoining portions, each with two corresponding side faces, a split line at the junction of said portions and an outer rim having a plurality of radially projecting sprocket teeth and axially extending chain support portions, said wheel further comprising:
 a hub portion with an axial bore and a shoulder portion extending axially from said hub portion on each of said side faces;
 said axial bore having at least one slotted captive keyway in sprockets used for transmitting torque;
 means for connecting said hub to said outer rim;
 each of said side faces having at least one pair of tapered recesses constructed and arranged on either side of said split line;
 clamping means designed to straddle said split line and draw together said adjoining portions of said wheel by exerting a clamping force on said pair of recesses; and
 a circular clamping band constructed and arranged to fit around said shoulder portion of said hub.

2. The polymeric split wheel defined in claim 1 wherein said connecting means is a plurality of integral spoke-like members, at least two of which providing a path for said split line between said hub and said rim.

3. The polymeric split wheel defined in claim 2 comprised of four spoke-like members.

4. The polymeric split wheel defined in claim 2 wherein said spoke-like members encompassing said split line are thicker than the remaining spoke-like members.

5. The polymeric split wheel defined in claim 1 wherein said tapered recesses are radially oriented and substantially parallel to each other.

6. The polymeric split wheel defined in claim 5 wherein said tapered recesses are constructed and arranged to be parallel to said split line.

7. The polymeric split wheel defined in claim 1 wherein said clamping means joining said portions of said wheel at said tapered recesses is comprised of a pair of rigid wedge dog clamps at each set of tapered recesses.

8. The polymeric split sprocket wheel defined in claim 7 wherein said wedge dog clamps are secured to said wheel by fastening means.

9. The polymeric split sprocket wheel defined in claim 8 wherein said fastening means comprises a rigid fastener passing axially through said wedge dogs and said wheel.

10. The polymeric split sprocket wheel defined in claim 9 wherein said fastening means comprises a rigid fastener passing through said wedge dogs and said wheel axially at said split line.

11. The polymeric split sprocket wheel defined in claim 7 wherein said tapered recesses of both of said side faces are located in back-to-back relationship.

12. The polymeric split sprocket wheel defined in claim 11 wherein said back-to-back wedge dog clamps are secured by fastening means.

13. The polymeric split sprocket wheel defined in claim 11 wherein said fastening means is a single rigid fastener passing through both wedge dog clamps and said wheel at said split line.

14. The polymeric split sprocket wheel defined in claim 13 wherein said fastening means include two of said wedge dog fastener assemblies.

15. The polymeric split sprocket wheel defined in claim 1 wherein said split line forms an angle of less than 180°.

16. The polymeric split sprocket wheel defined in claim 1 wherein said circular clamping band is capable of exerting a uniform clamping force around the full periphery of said hub shoulders.

17. The polymeric split sprocket wheel defined in claim 1 wherein said wheel is fabricated from high strength polyurethane or other engineering grade polymer.

18. A polymeric split sprocket wheel designed to be mounted on a relatively immobile yet rotatable rigid shaft, and having two mating portions, that when joined form a sprocket having two side faces, a split line at the junction of said mating portions, and an outer rim with a plurality of radially projecting sprocket teeth and axially extending chain support portions, said wheel comprising:
a hub portion with an axial bore and a shoulder portion extending axially from said hub portion on each of said side faces;
said axial bore having at least one slotted captive keyway in sprockets used for transmitting torque;
a plurality of integral spoke-like members connecting said hub to said rim, with at least two of said members encompassing said split line;
said mating wheel portions held together by at least two wedge dog clamping assemblies comprised of:
a pair of substantially parallel tapered recesses straddling said split line in a parallel orientation on each side face such that the recesses on each side face are in a back-to-back relationship;
a wedge dog clamp constructed and arranged to engage said recesses on each side face and draw together said mating portions of said wheel, said adjacent wedge dogs of both side faces joined by a fastener passing through both dogs and a bore passing through a sandwiched area of said mating wheel portion at said split line; and
a circular clamping band constructed and arranged to hold said wheel portions together in said hub region by encompassing said outwardly projecting shoulders so that a uniform clamping force is exerted around the full periphery of said shoulders.

* * * * *